(12) United States Patent
Yao

(10) Patent No.: US 11,557,047 B2
(45) Date of Patent: Jan. 17, 2023

(54) METHOD AND APPARATUS FOR IMAGE PROCESSING AND COMPUTER STORAGE MEDIUM

(71) Applicant: Beijing Baidu Netcom Science and Technology Co., Ltd., Beijing (CN)

(72) Inventor: Meng Yao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/214,191

(22) Filed: Mar. 26, 2021

(65) Prior Publication Data
US 2021/0217187 A1 Jul. 15, 2021

(30) Foreign Application Priority Data

Jun. 30, 2020 (CN) .......................... 202010624149.2

(51) Int. Cl.
*G06T 7/38* (2017.01)
*G06T 7/32* (2017.01)
(Continued)

(52) U.S. Cl.
CPC .............. *G06T 7/38* (2017.01); *G06K 9/6215* (2013.01); *G06T 7/32* (2017.01); *G06T 7/70* (2017.01); *G06T 17/00* (2013.01); *G06T 19/20* (2013.01); *G06T 2207/10016* (2013.01); *G06T 2207/20221* (2013.01); *G06T 2207/30252* (2013.01); *G06T 2219/2004* (2013.01)

(58) Field of Classification Search
None
See application file for complete search history.

(56) References Cited

U.S. PATENT DOCUMENTS

| 7,352,386 B1 | 4/2008 | Shum |
| 2013/0057692 A1* | 3/2013 | Naito ....................... G06K 9/00 348/150 |
| 2018/0173995 A1 | 6/2018 | Shinichi |

FOREIGN PATENT DOCUMENTS

| JP | 2018101914 A | 6/2018 |
| KR | 20060015755 A | 2/2006 |
| WO | WO 2009/089126 A1 | 7/1999 |

OTHER PUBLICATIONS

European Patent Office, Extended European Search Report for Application No. 21165541.0, dated Oct. 1, 2021 (12 pages).
(Continued)

*Primary Examiner* — Jennifer Mehmood
*Assistant Examiner* — Jed-Justin Imperial
(74) *Attorney, Agent, or Firm* — Nixon Peabody LLP

(57) ABSTRACT

A method and an apparatus for processing an image are provided. The method may include: acquiring a set of image sequences, the set of image sequences including a plurality of image sequence subsets divided according to similarity measurements between image sequences, each image sequence subset including a basic image sequence and other image sequence, wherein a first similarity measurement corresponding to the basic image sequence is greater than or equal to a first similarity measurement corresponding to the other image sequence; creating an original three-dimensional model using the basic image sequence; and creating a final three-dimensional model using the other image sequence based on the original three-dimensional model.

20 Claims, 7 Drawing Sheets

(51) Int. Cl.
*G06T 7/70* (2017.01)
*G06K 9/62* (2022.01)
*G06T 17/00* (2006.01)
*G06T 19/20* (2011.01)

(56) References Cited

OTHER PUBLICATIONS

Farenzena, M. et al.; "Structure-and-motion pipeline on a hierarchical cluster tree"; 2009 IEEE 12th International Conference on Computer Vision Workshops, ICCV Workshops; Kyoto, Japan; Sep. 27-Oct. 4, 2009; Institute of Electrical and Electronics Engineers, Piscataway, New Jersey, Sep. 27, 2009, pp. 1489-1496; XP031664465; ISBN: 978-1-4244-4442-7 (8 pages).

Stathopoulou, E.-K. et al., "Open-Source Image-Based 3D Reconstruction Pipelines: Review, Comparison and Evaluation"; ISPRS—International Archives of the Photogrammetry, Remote Sensing and Spatial Information Sciences, vol. XLII-2/W17, Nov. 29, 2019; pp. 331-338; XP055835368; ISSN: 2194-9034 (8 pages).

Sturgess, P. et al.; Combining Appearance and Structure from Motion Features for Road Scene Understanding; Proceedings of the British Machine Vision Conference 2009, Sep. 7, 2009, pp. 62.1-62.11, XP055835362; DOI: 10.5244/C.23.62; ISBN: 978-1-901725-39-1 (11 pages).

\* cited by examiner

METHOD AND APPARATUS FOR IMAGE PROCESSING AND COMPUTER STORAGE MEDIUM

CROSS-REFERENCE TO RELATED APPLICATIONS

This application claims the priority of Chinese Patent Application No. 202010624149.2, titled "METHOD AND APPARATUS FOR IMAGE PROCESSING AND COMPUTER STORAGE MEDIUM", filed on Jun. 30, 2020, the content of which is incorporated herein by reference in its entirety.

TECHNICAL FIELD

Embodiments of the present disclosure relate to the field of image processing, and more particularly, to a method and apparatus for processing an image and to a computer storage medium, which may be applicable to the field of automatic-driving.

BACKGROUND

In the field of automatic-driving, particularly in autonomous parking or cruising scenes such as in parking lots or residential roads, it is desirable to reconstruct and fuse a three-dimensional model for these scenes based on driving record images acquired, for example, by a vehicle or other device for acquiring these images. However, since the amount of data of the driving record images is usually very large, reconstruction and fusion of the three-dimensional model may involve a large amount of computation and occupy a large amount of system resources. In addition, as the amount of data of the driving record images is further increased, the amount of computation and occupied system resource for reconstructing and fusing the three-dimensional model are increased at an exponential level, which not only imposes a great computational burden on, for example, the reconstruction and fusion of the three-dimensional model that can be performed by the cloud, but also consumes a large amount of time, thereby affecting the reconstruction and fusion efficiency of the three-dimensional model and reducing the user's experience.

SUMMARY

According to embodiments of the present disclosure, a parallel three-dimensional reconstruction and fusion method is provided based on a mass driving technique images matched image timing features.

In a first aspect of the present disclosure, there is provided a method of processing an image, including: acquiring a set of image sequences, the set of image sequences including a plurality of image sequence subsets divided according to similarity measurement between image sequences, each image sequence subset including a basic image sequence and other image sequences, wherein a first similarity measurement corresponding to the basic image sequence is greater than or equal to a first similarity measurement corresponding to the other image sequences; creating an original three-dimensional model using the basic image sequence; and creating a final three-dimensional model using the other image sequences based on the original three-dimensional model.

In a second aspect of the present disclosure, there is provided an apparatus for processing an image, including: an image sequence set acquisition module configured to acquire an image sequence set, the image sequence set including a plurality of image sequence subsets divided according to similarity measurements between image sequences, each image sequence subset including a basic image sequence and another image sequence, wherein a first similarity measurement corresponding to the basic image sequence is greater than or equal to a first similarity measurements corresponding to the other image sequences; an original three-dimensional model modeling module configured to create an original three-dimensional model using the basic image sequence; and a final three-dimensional model modeling module configured to create a final three-dimensional model using the other image sequences based on the original three-dimensional model.

In a third aspect of the present disclosure, there is provided an electronic device including at least one processor; and a memory in communication connection with the at least one processor; wherein the memory stores instructions executable by the at least one processor to enable the at least one processor to implement the method according to the first aspect of the present disclosure. In a fourth aspect of the present disclosure, there is provided a non-transitory computer readable storage medium having stored thereon computer instructions for causing the computer to implement a method according to the first aspect of the present disclosure.

It is to be understood that what is described in the Summary does not intend to limit the critical or important features of the embodiments of the disclosure, nor does intend to limit the scope of the disclosure. Other features of the present disclosure will become readily apparent from the following description.

BRIEF DESCRIPTION OF THE DRAWINGS

The above and other objects, features, and advantages of the present disclosure will become more apparent from the more detailed description of exemplary embodiments of the disclosure, taken in conjunction with the accompanying drawings, in which same reference numerals refer generally to the same components in the exemplary embodiments of the disclosure. It is to be understood that the drawings are for a better understanding of the present disclosure and are not to be construed as limiting the disclosure, where.

In the various drawings, the same or corresponding reference numerals indicate the same or corresponding features.

DETAILED DESCRIPTION OF EMBODIMENTS

Figure 1:
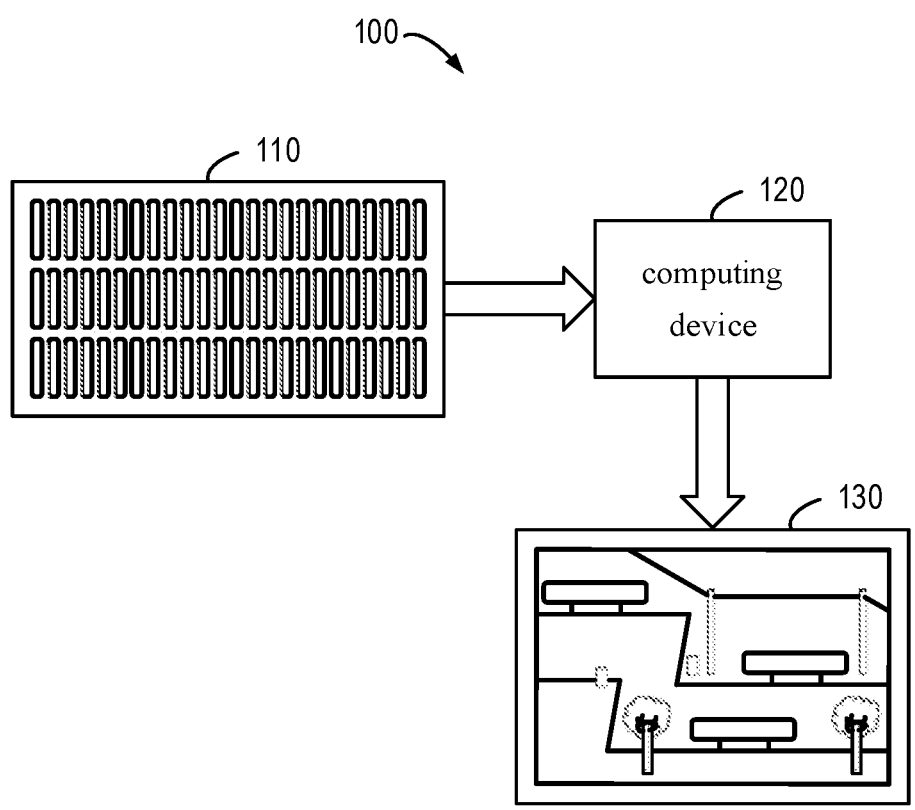
FIG. 1 illustrates a schematic diagram of an image processing environment 100 in which the method of processing an image according to exemplary embodiments of the present disclosure may be implemented.

Embodiments of the present disclosure will be described in more detail below with reference to the accompanying drawings. While embodiments of the disclosure are shown in the drawings, it is to be understood that the disclosure may be implemented in various forms and should not be limited to the embodiments set forth herein. Instead, these embodiments are provided so that this disclosure will be thorough and complete, and will fully convey the scope of this disclosure to those skilled in the art.

The term "comprising" and variations thereof, as used herein, means an open-ended, i.e., "including, but not limited to". Unless specifically stated, the term "or" means "and/or". The term "based on" means "based at least partly on". The terms "one exemplary embodiment" and "one embodiment" means "at least one exemplary embodiment". The term "another embodiment" means "at least one further embodiment". The terms "first", "second" or the like may refer to different or same objects. Other explicit and implicit definitions may also be included below.

As described above in the background, the use of conventional three-dimensional model reconstruction and fusion methods involves a large amount of computation and occupies a large amount of system resources, thereby affecting the validity and feasibility of the three-dimensional modeling, reducing the user's experience or even resulting in a failure to meet user's requirements.

To at least partially address one or more of the above and other potential problems, embodiments of the present disclosure propose a method of processing an image for three-dimensional modeling. In the solution described in the present disclosure, the matching of two-dimensional images and the similarity calculation are used for three-dimensional fusion and reconstruction, and data are optimized and grouped before the three-dimensional reconstruction, and thus it avoids using massive data to fuse the three-dimensional model, which otherwise occupies system resources and high time complexity. Meanwhile, in the solution described in the present disclosure, the mass image sequences from the automobile data recorder are grouped in accordance with the video correlation graphic based on two-dimensional image similarity, so that the calculation amount of the three-dimensional reconstruction is converted from the original exponential growth to the linear growth, and the success rate of modeling can be improved by creating the models in parallel.

With the technology according to the present disclosure, it is possible to improve the efficiency of creating the three-dimensional model and reduce the overhead of creating the three-dimensional model.

FIG. 1 illustrates a schematic diagram of an image processing environment 100 in which the method of processing an image in exemplary embodiments of the present disclosure may be implemented. As shown in FIG. 1, the image processing environment 100 includes a computing device 120, an image sequence set 110 as input data of the computing device 120, and a three-dimensional model 130 as output data of the computing device 120. It should be noted that the image processing environment 100 is extensible and may include more sets of image sequences 110 as input data, more three-dimensional model 130 as output data, or more computing devices 120 to support more efficient parallel computing for the image sequence set 110. For purposes of simplifying the diagram, only one image sequence set 110, one computing device 120, and one three-dimensional model 130 are shown in FIG. 1.

In the description of embodiments of the present disclosure, a set of image sequences refers to a set of one or more image sequences, wherein each image in an image sequence corresponds to a frame of images acquired by an acquiring images device. According to an embodiment of the present disclosure, an image sequence is acquired by an acquiring images device installed or included on a vehicle or other device for acquiring a driving record image, wherein each acquired frame of image includes an ambient environment to which the acquiring images device is facing and other objects such as a person, a bicycle, a pet, and the like in the environment. In a process of acquiring images, an acquiring images device may acquire a frame of an image at time intervals or at distance intervals, and the images sequentially acquired throughout the acquiring images process form an image sequence for this process of acquiring images, wherein the image sequence may be embodied in the form of a video.

In the description of embodiments of the present disclosure, three-dimensional model reconstruction and fusion of a set of image sequences refers to a process of obtaining a three-dimensional model by using the set of image sequences to model. According to an embodiment of the present disclosure, the obtained three-dimensional model may include a three-dimensional point cloud of the surrounding environment of, for example, a parking lot or a residential road, to which the set of image sequences relate, as well as the content and related information of each acquired image.

In the description of embodiments of the present disclosure, three-dimensional model reconstruction and fusion may be a sequential linear process, i.e., a modeling process is accomplished by continually adding new images to participate in modeling, where the added images may reach hundreds of thousands or more.

Figure 2:
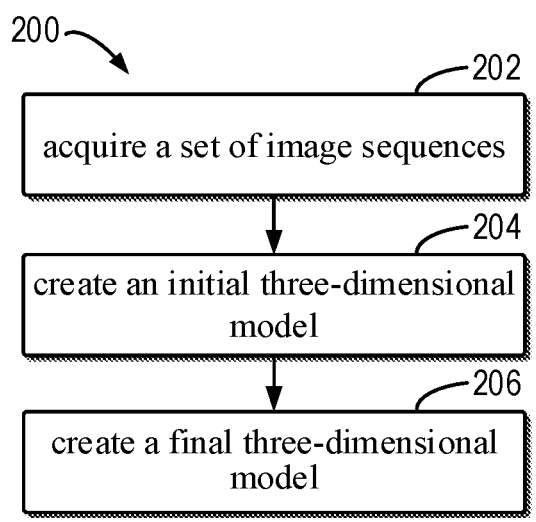
FIG. 2 illustrates a flowchart of a method 200 for processing an image according to an embodiment of the present disclosure.

FIG. 2 illustrates a flow diagram of a method 200 for processing an image according to an embodiment of the present disclosure. In particular, the method 200 may be performed by the computing device 120. It should be understood that the method 200 may also include additional operations not shown and/or omit some of the shown operations, and the scope of the present disclosure is not limited in this respect.

At block 202, the computing device 120 acquires a set of image sequences 110. According to an embodiment of the present disclosure, the image sequence set 110 includes a plurality of image sequence subsets divided according to similarity measurement between image sequences, wherein each image sequence subset includes a basic image sequence and other image sequences, and a first similarity measurement corresponding to the basic image sequence is greater than or equal to the first similarity measurement corresponding to the other image sequences.

Figure 3:
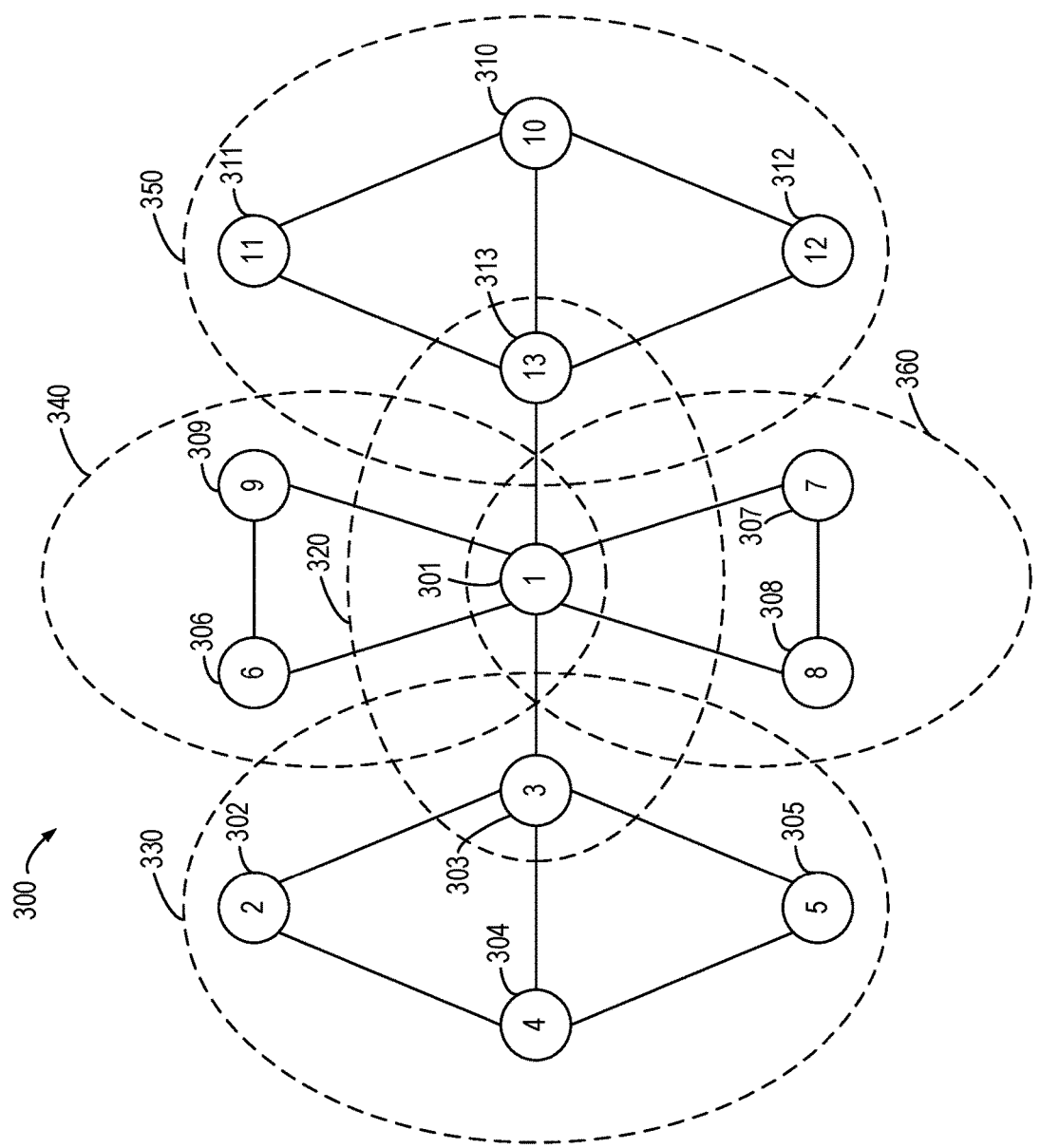
FIG. 3 illustrates a schematic diagram of an interrelationship 300 of an image sequence according to an embodiment of the present disclosure.

The set of image sequences 110 is further described below in connection with FIG. 3. FIG. 3 illustrates a schematic diagram of an interrelationship 300 of the image sequences according to an embodiment of the present disclosure. A total of 13 image sequences are shown in FIG. 3, i.e., the image sequences 301, 302, 303, 304, 305, 306, 307, 308, 309, 310, 311, 312, and 313, which together constitute an example of the image sequence set 110. In FIG. 3, a plurality of image sequence subsets are shown in circles of dashed line 320, 330, 340, 350, and 360, wherein the image sequence subset 320 includes the image sequences 303, 301, and 313, the image sequence subset 330 includes the image sequences 302, 303, 304, and 305, the image sequence subset 340 includes the image sequences 301, 306, and 309, the image sequence subset 350 includes the image sequences 310, 311, 312, and 313, and the image sequence subset 360 includes the image sequence 301, 307, and 308.

In the image sequence shown in FIG. 3, the image sequences 301, 303, and 313 are basic image sequences, which together constitute an image sequence subset 320. The basic image sequence includes most of the stable elements, and the correlation between them is highest, which is embodied as having a higher similarity measurement, so that the three-dimensional modeling can be first performed by using the basic image sequence, and then further three-dimensional modeling can be performed by using other image sequences. In addition, the basic image sequences are included in all the image sequence subset 320, 330, 340, 350, and 360, so that the other image sequences can be utilized for modeling after three-dimensional model is created with the basic image sequence, since these other image sequences all have a high degree of correlation with a certain basic image sequence. In addition, the image sequence subset 320, 330, 340, 350, and 360 may be divided according to similarity measurements. According to an exemplary embodiment of the present disclosure, a second similarity measurement corresponding to an image sequence subset in each image sequence subset is greater than or equal to a second similarity measurement corresponding to an image sequence subset in other subsets of image sequences. According to an embodiment of the present disclosure, the first similarity measurement is greater than or equal to the second similarity measurement.

At block 204, the computing device 120 uses the basic image sequence to create an original three-dimensional model. Taking the example in FIG. 3, the computing device 120 uses the image sequences 301, 303, and 313 as basic image sequences to create an original three-dimensional model.

According to an exemplary embodiment of the present disclosure, when the computing device 120 uses the image sequences 301, 303, and 313 as the basic image sequences to create the original three-dimensional model, it is necessary to first align the image sequences 301, 303, and 313 and additionally segment them.

Figure 4:
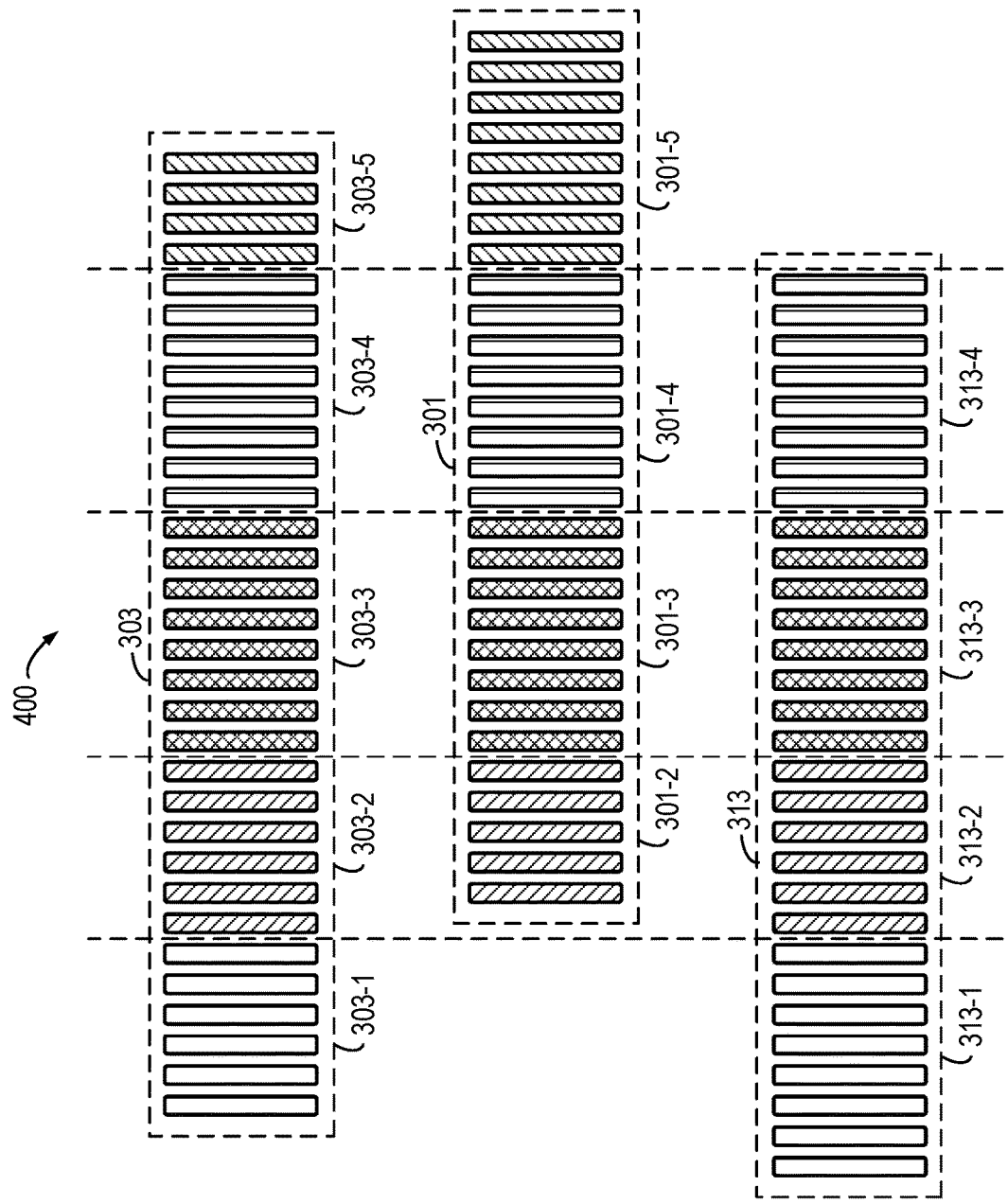
FIG. 4 illustrates a schematic diagram of an correlation relationship and segments 400 of a basic image sequence according to an embodiment of the present disclosure.

FIG. 4 illustrates a schematic diagram of an correlation relationship and segmenting 400 of basic image sequences according to an embodiment of the present disclosure. According to this exemplary embodiment of the present disclosure, in conjunction with the example in FIG. 3, since the start positions for acquiring images of the image sequence 301, 303, and 313 may be different, the scenes for these images are also different. In three-dimensional modeling, it needs to use images acquired at the same acquisition positions. Therefore, it is necessary to find images acquired for the same acquisition location in different image sequences, among which there is a higher similarity measurement, and this operation may also be referred to as determining a correlated image between different image sequences. It will be appreciated that the images in each of the image sequences 301, 303, and 313 are all arranged in the timing order in which they are acquired, so that when the first image in the each sequence is aligned, the subsequent images therein have a greater probability of being also aligned, at which point the process of aligning the subsequent images by determining a similarity measurement may be omitted.

According to an exemplary embodiment of the present disclosure, the computing device 120 determines a correlated image for a basic image sequence between basic image sequences according to at least one of: acquisition locations of the images and a third measurement of similarity between the images.

As shown in FIG. 4, the three image sequences 303, 301, and 313 are staggered, i.e. aligned, so that the images at the same location are acquired at the same acquisition location and have a higher similarity measurement. According to an exemplary embodiment of the present disclosure, different image sequences may have different numbers of images, and thus the total lengths of the three image sequences 303, 301, and 313 are not the same.

After the computing device 120 determines a correlated image for the basic image sequence between the basic image sequences, i.e., after aligning the basic image sequences, a three-dimensional model may be created using the correlated image for the basic image sequences.

According to an exemplary embodiment of the present disclosure, when the length of the basic image sequence is long, directly aligning the image sequences to create the three-dimensional model may involve a large amount of computation and occupy a large amount of system resources. Therefore, in order to further reduce the computation amount and the system resource occupation, the basic image sequence can be segmented. The criteria for segmentation may be the computing power of an available computer or computing thread. The greater the computational power of the available computer or computing thread, the less the number of segments may be.

As shown in FIG. 4, the basic image sequence 303 is divided into five segments, namely, segments 303-1, 303-2, 303-3, 303-4, and 303-5; the basic image sequence 301 is divided into four segments, namely, segments 301-2, 301-3, 301-4, and 301-5; and the basic image sequence 313 is divided into four segments, namely, segments 313-1, 313-2, 313-3, and 313-4. As shown in FIG. 4, the segments 303-1 and 313-1 are aligned, the segments 303-2, 301-2 and 313-2 are aligned, the segments 303-3, 301-3 and 313-3 are aligned, the segments 303-4, 301-4 and 313-4 are aligned, and the segments 303-5 and 301-5 are aligned.

According to an exemplary embodiment of the present disclosure, after the computing device 120 has segmented the basic image sequences, an original basic segmented three-dimensional model may be created for the first segment.

Figure 5:
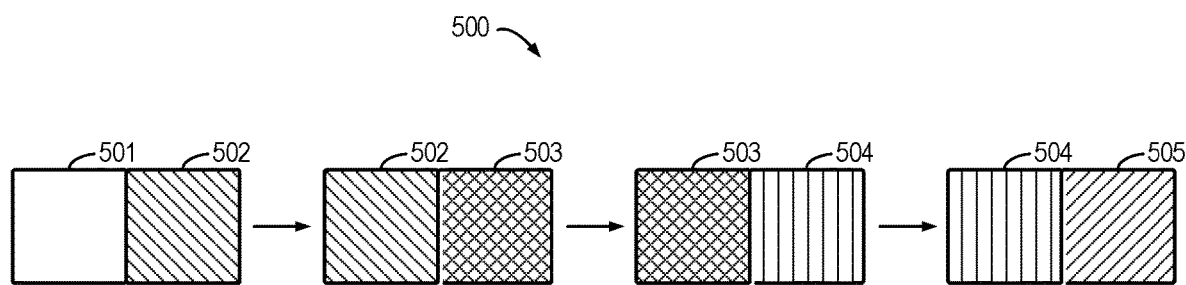
FIG. 5 illustrates a schematic diagram of an incremental modeling process 500 utilizing a basic image sequence according to an embodiment of the present disclosure.

FIG. 5 illustrates a schematic diagram of an incremental modeling process 500 utilizing a basic image sequence according to an embodiment of the present disclosure. As shown in FIG. 5, after modeling with the segments 303-1 and 313-1 in FIG. 4, an original basic segmented three-dimensional model 501 is obtained. As shown in FIG. 4, since the segments 303-2 and 313-2 are segments immediately after segments 303-1 and 313-1, the incremental modeling may be performed using the segments 303-2 and 313-2 and the corresponding segments 301-2 based on the original basic segmented three-dimensional model 501 to obtain incremental basic segmented three-dimensional model 502 corresponding to segments 303-2, 313-2 and 301-2. Then, the incremental basic segmented three-dimensional model 502 may be used as an original basic segmented three-dimensional model, incremental modeling may be performed using further immediate segments 303-3, 313-3, and 301-3 based on the basic segmented three-dimensional model 502 only, thereby obtaining an incremental basic segmented three-dimensional model 503, and the incremental basic segmented three-dimensional models 504 and 505 by analogy.

The computing device 120 may then fuse the created original basic segmented three-dimensional model 501 with the subsequently created incremental basic segmented three-dimensional models 502, 503, 504, and 505 to obtain an original three-dimensional model.

Figure 6:
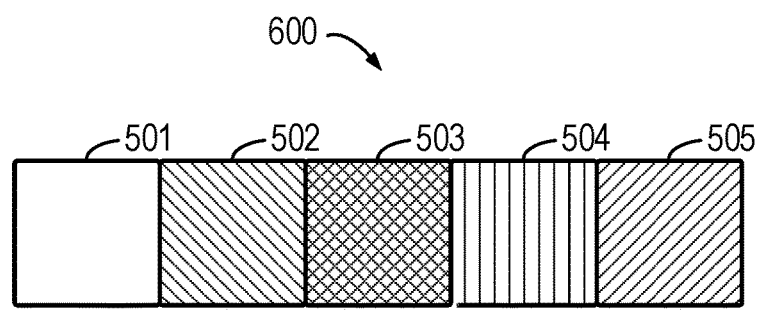
FIG. 6 illustrates a schematic diagram of an original three-dimensional model 600 according to an embodiment of the present disclosure.

Referring to FIG. 6, a schematic diagram of an original three-dimensional model 600 according to an embodiment of the present disclosure is shown. As shown in FIG. 6, the original three-dimensional model 600 includes basic segmented three-dimensional models 501, 502, 503, 504, and 505.

According to an exemplary embodiment of the present disclosure, the original three-dimensional model may be created using the four pairs of basic segmented three-dimensional models shown in FIG. 5 as a whole, i.e., using the basic segmented three-dimensional models 501 and 502, the basic segmented three-dimensional models 502 and 503, the basic segmented three-dimensional models 503 and 504, and the basic segmented three-dimensional models 504 and 505. In this case, since each pair of basic segmented three-dimensional models has a portion that overlaps with the previous or subsequent pair of basic segmented three-dimensional models, the creation of the original three-dimensional model may be more easily achieved.

According to an exemplary embodiment of the present disclosure, a plurality of incremental basic segmented three-dimensional models may be created in parallel. For example, as shown in FIG. 4, the original basic segmented three-dimensional model 503 may be first created using the corresponding segments 303-3, 301-3, and 313-3, and then incremental modeling may be performed in parallel based on the original basic segmented three-dimensional model 503 by using two computers or different threads of the same computer, utilizing the segments 303-2, 313-2, and 301-2, or segments 303-4, 313-4, and 301-4, respectively, to obtain incremental original basic segmented three-dimensional models 502 and 504 in parallel.

Returning to FIG. 2, at 206, the computing device 120 creates a final three-dimensional model using other image sequences based on the original three-dimensional model.

According to an embodiment of the present disclosure, if the original three-dimensional model does not involve segmentation, and all image sequences are naturally aligned, the computing device 120 may create a plurality of intermediate three-dimensional models based on the original three-dimensional model using other image sequences in a plurality of image sequence subsets, respectively, wherein each intermediate three-dimensional model corresponds to one subset of image sequences. Then, the computing device 120 fuses the plurality of intermediate three-dimensional models to obtain a final three-dimensional model. It will be appreciated that since the process of creating the intermediate three-dimensional model based on the original three-dimensional model is an incremental modeling, the original three-dimensional model portion of the obtained intermediate three-dimensional models are the same, so that they may be more easily fused to obtain the final three-dimensional model. According to embodiments of the present disclosure, the processes of creating the intermediate three-dimensional model may be performed in parallel using a plurality of different computers or different computing threads, so that the speed at which the final three-dimensional model is obtained may be increased.

According to an embodiment of the present disclosure, if the original three-dimensional model does not involve segmentation, and all image sequences are not naturally aligned, it is also necessary to align all image sequences. For example, the computing device 120 may determine a correlated image between image sequences in an image sequence set based on at least one of acquisition locations of the images, and a third measurement of similarity between the images, wherein the correlated image includes a correlated image for a basic image sequence and a correlated image for other image sequences. This alignment process is similar to that described above with respect to FIG. 4 and will not be repeated here.

According to an embodiment of the present disclosure, if the original three-dimensional model consists of a plurality of basic segmented three-dimensional models, the original three-dimensional model 600 shown in FIG. 6 as example consists of the basic segmented three-dimensional models 501, 502, 503, 504, and 505, and all image sequences are not naturally aligned. The computing device 120 will first align all image sequences as described above, then, the computing device 120 will segment the other image sequences according to the segmentation of the basic image sequence.

Figure 7:
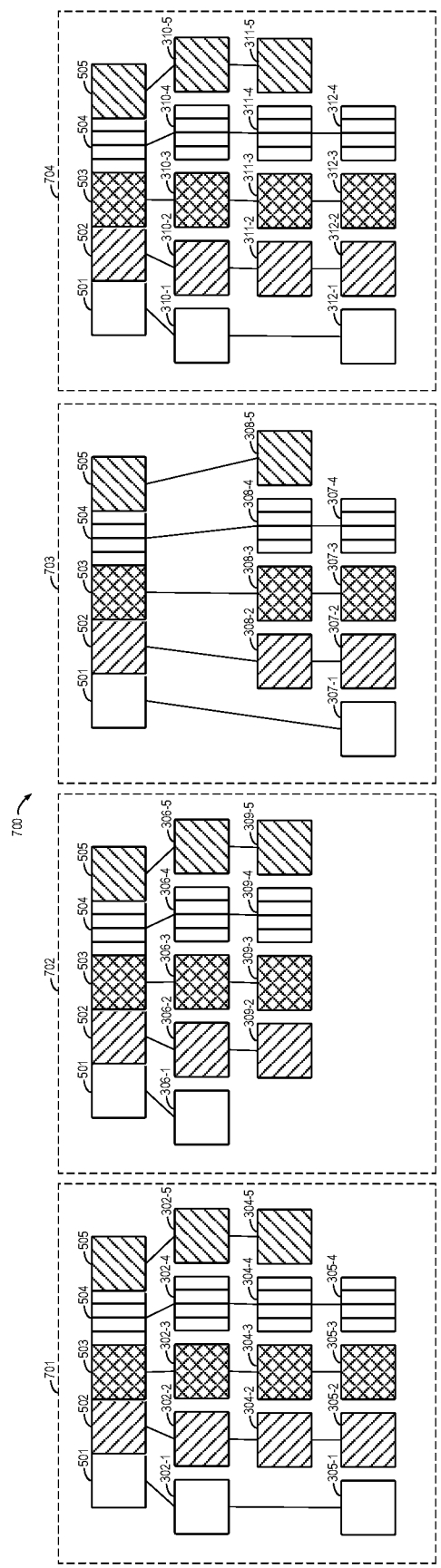
FIG. 7 illustrates a schematic diagram of a process 700 for creating a final three-dimensional model using an original three-dimensional model according to an embodiment of the present disclosure.

FIG. 7 illustrates a schematic diagram of a process 700 for creating a final three-dimensional model using an original three-dimensional model according to an embodiment of the present disclosure. The four dashed line boxes 701, 702, 703 and 704 in FIG. 7 represent four different computing devices, respectively, which may also be servers, and which may be cloud computing devices. In each computing device, the process of incremental modeling is performed based on an original three-dimensional model consisting of the basic segmented three-dimensional models 501, 502, 503, 504, and 505, the purpose of distinguishing different computing devices is to illustrate that these incremental modeling processes may be performed in parallel by these computing devices.

According to an embodiment of the present disclosure, all other image sequences are aligned with the basic image sequences 303, 301, and 313 and correspondingly divided into segments, wherein the other image sequence 302 is divided into segments 302-1, 302-2, 302-3, 302-4, and 302-5, the other image sequence 304 is divided into segments 304-2, 304-3, 304-4, and 304-5, the other image sequence 305 is divided into segments 305-1, 305-2, 305-3, and 305-4, the other image sequence 306 is divided into segments 306-1, 306-2, 306-3, 306-4, and 306-5, the other image sequence 309 is divided into segments 309-2, 309-3, 309-4, and 309-5, the other image sequence 308 is divided into segments 308-2, 308-3, 308-4, and 308-5, the other image sequence 307 is divided into segments 307-1, 307-2, 307-3, and 307-4, the other image sequence 310 is divided into segments 310-1, 312-2, 310-3, 310-4, and 310-5, and the other image sequence 311 is divided into segments 311-2, 311-3, 311-4, and 312-5, and other image sequence 312 is divided into segments 312-1, 312-2, 312-3, and 312-4.

Then, the four computing devices 701, 702, 703, and 704 respectively use segments divided from the basic image sequences 302, 304, 305, 306, 309, 308, 307, 310, 311, and 312 to perform the incremental modeling, based on the original three-dimensional model consisting of the basic segmented three-dimensional models 501, 502, 503, 504, and 505. Wherein the different segments connected by the line segments indicate the corresponding relationship of the segments with the basic segmented three-dimensional model, and the processes of incremental modeling of the corresponding entire segments by one basic segmented three-dimensional model may be performed in parallel with the processes of incremental modeling of the corresponding entire segments by other basic segmented three-dimensional models, e.g., by different threads in the computing devices 701, 702, 703, and 704.

The above describes an image processing environment 100 in which the method of processing an image in certain exemplary embodiments of the present disclosure may be implemented, a method for processing an image 200 according to an embodiment of the present disclosure, an interrelationship 300 of image sequences according to an embodiment of the present disclosure, a correlation and segment 400 of a basic image sequence according to an embodiment of the present disclosure, an incremental modeling process 500 using the basic image sequence according to an embodiment of the present disclosure, an original three-dimensional model 600 according to an embodiment of the present disclosure, and related content of a process 700 using the original three-dimensional model to create a final three-dimensional model according to an embodiment of the present disclosure, with reference to FIGS. 1 to 7. It is to be understood that the foregoing description intends to provide a better illustration of what is recited in the present disclosure, and does not intend to be limiting in any way.

It is to be understood that the number and magnitude of the various elements illustrated in the various figures of the present disclosure are by way of example only and does not intend to limit the scope of protection of the disclosure. The above numbers and sizes may be arbitrarily set as desired without affecting the normal implementation of the embodiments of the present disclosure.

Details of a method of processing an image according to an embodiment of the present disclosure have been described above with reference to FIGS. 1-7. Hereinafter, various modules in an apparatus for processing an image will be described with reference to FIG. 8.

Figure 8:
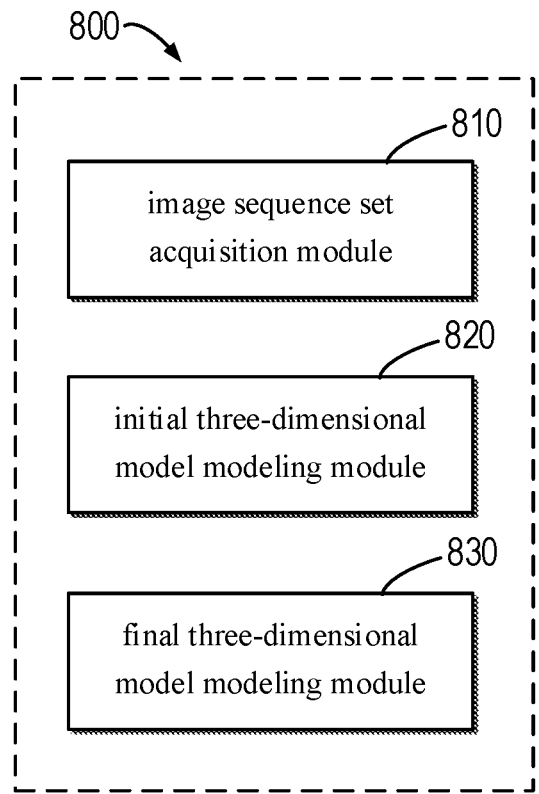
FIG. 8 illustrates a schematic block diagram of an image processing apparatus 800 according to an embodiment of the present disclosure.

FIG. 8 is a schematic block diagram of an apparatus 800 for processing an image according to an embodiment of the present disclosure. As shown in FIG. 8, the apparatus 800 may include an image sequence set acquisition module 810 configured to acquire an image sequence set including a plurality of image sequence subsets divided according to a similarity measurement between image sequences, wherein each image sequence subset includes a basic image sequence and other image sequences, and wherein a first similarity measurement corresponding to the basic image sequence is greater than or equal to a first similarity measurement corresponding to the other image sequences. The apparatus 800 may further include an original three-dimensional model modeling module 820 configured to create an original three-dimensional model using the basic image sequence and a final three-dimensional model modeling module 830 configured to create a final three-dimensional model using the other image sequences based on the original three-dimensional model.

In some embodiments, wherein the second similarity measurement corresponding to the image sequence subset in each image sequence subset s is greater than or equal to the second similarity measurement corresponding to image sequence subset in other image sequence subset.

In certain embodiments, wherein the original three-dimensional model modeling module 820 includes a first correlated image determining module (not shown) configured to determine a correlated image for a basic image sequence between the basic image sequences based on at least one of acquisition locations of the images, and a third measurement of similarity between the images; and a first original three-dimensional model modeling module (not shown) configured to create the original three-dimensional model using the correlated image for the basic image sequence.

In certain embodiments, wherein the original three-dimensional model modeling module 820 includes a basic segmentation division module (not shown) configured to divide the correlated image for the basic image sequence into a plurality of corresponding basic segments in an order of acquiring the images; an original basic segmented three-dimensional model modeling module (not shown) configured to create an original basic segmented three-dimensional model using one corresponding basic segment of the plurality of corresponding basic segments; an incremental basic segmented three-dimensional model modeling module (not shown) configured to create an incremental basic segmented three-dimensional model using a corresponding basic segment adjacent to the one corresponding basic segment based on the created original basic segmented three-dimensional model; and a second original three-dimensional model modeling module (not shown) configured to fuse the original basic segmented three-dimensional model and the incremental basic segmented three-dimensional model to obtain the original three-dimensional model.

In certain embodiments, the incremental basic segmented three-dimensional model modeling module is configured to create a plurality of the incremental basic segmented three-dimensional models in parallel.

In some embodiments, the final three-dimensional model modeling module 830 includes a first intermediate three-dimensional model modeling module (not shown) configured to create a plurality of intermediate three-dimensional models based on the original three-dimensional model using the other image sequences in the plurality of image sequence subsets, respectively; and a first final three-dimensional model modeling module (not shown) configured to fuse the plurality of intermediate three-dimensional models to obtain the final three-dimensional model.

In certain embodiments, the intermediate three-dimensional model modeling module is configured to create a plurality of the intermediate three-dimensional models in parallel.

In some embodiments, the final three-dimensional model modeling module 830 includes a second correlated image determining module (not shown) configured to determine an correlated image between image sequences in the set of image sequences based on at least one of acquisition locations of the images, and a third measurement of similarity between the images, wherein the correlated image includes a correlated image for the basic image sequence and a correlated image for the other image sequences; and a second final three-dimensional model modeling module (not shown) configured to create the final three-dimensional model using a correlated image for the other image sequence.

In some embodiments, the final three-dimensional model modeling module 830 includes a second correlated image determining module (not shown) configured to determine an correlated image between image sequences in the set of image sequences based on at least one of acquisition locations of the images, and a third measurement of similarity between the images, wherein the correlated image includes a correlated image for the basic image sequence and a correlated image for the other image sequences; a segment dividing module (not shown) configured to divide the correlated image into a plurality of corresponding segments in an acquiring images order, the plurality of corresponding segments including the plurality of corresponding basic segments and a plurality of corresponding other segments divided from the other image sequences; a first intermediate three-dimensional model modeling module (not shown) configured to create a plurality of intermediate three-dimensional models based on the original three-dimensional model using the other segments corresponding to the original basic segmented three-dimensional model and the incremental basic segmented three-dimensional model; and a first final three-dimensional model modeling module (not shown) configured to fuse the plurality of intermediate three-dimensional models to obtain the final three-dimensional model.

In certain embodiments, the first intermediate three-dimensional model modeling module is configured to create a plurality of the intermediate three-dimensional models in parallel.

According to an embodiment of the present disclosure, the present disclosure also provides an electronic device and a readable storage medium.

From the above description with reference to FIGS. 1 to 8, the technical solution according to an embodiment of the present disclosure has a number of advantages over conventional solutions. For example, by using the technical solution, the video sequence correlation mapping may be fully utilized, and the data fused with the three-dimensional reconstruction model may be reasonably divided, so that the computational complexity of mass three-dimensional fusion modeling on the cloud end is greatly reduced, and the process is suitable for performing distributed parallel processing, and the computing capability of the company cluster is fully utilized, thereby greatly improving the computational efficiency.

Figure 9:
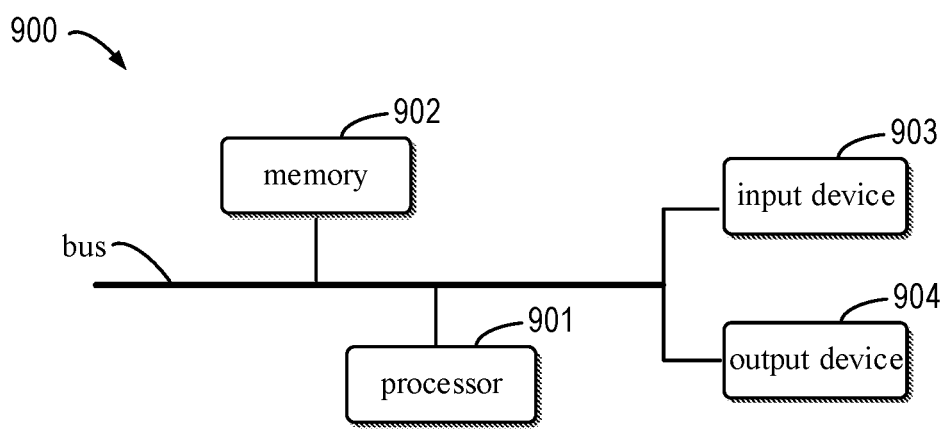
FIG. 9 illustrates a schematic block diagram of an electronic device 900 according to an embodiment of the present disclosure.

FIG. 9 shows a schematic block diagram of an electronic device 900 according to an embodiment of the present disclosure. For example, the computing device 120 shown in FIG. 1 and the apparatus 800 for processing an image shown in FIG. 8 may be implemented by an electronic device 900. Electronic device 900 is intended to represent various forms of digital computers, such as laptop computers, desktop computers, worktables, personal digital assistants, servers, blade servers, mainframe computers, and other suitable computers. Electronic device 900 may also represent various forms of mobile devices, such as personal digital processing, cellular telephones, smart phones, wearable devices, and other similar computing devices. The components shown herein, their connections and relationships, and their functions are by way of example only and are not intended to limit the implementation of the disclosure described and/or claimed herein.

As shown in FIG. 9, the electronic device 900 includes one or more processors 901, a memory 902, and an interface for connecting components, including a high speed interface and a low speed interface. The various components are interconnected by different buses and may be mounted on a common motherboard or otherwise as desired. The processor may process instructions executed within the electronic device 900, including instructions stored in or on a memory to display graphical information of the GUI on an external input/output device, such as a display device coupled to an interface. In other embodiments, multiple processors and/or multiple buses may be used with multiple memories, if desired. Similarly, a plurality of electronic devices 900 may be connected, each providing a portion of the necessary operations (e.g., as a server array, a set of blade servers, or a multiprocessor system). One processor 901 is exemplified in FIG. 9.

Memory 902 is a non-transitory computer readable storage medium provided by the present disclosure. Wherein the memory stores instructions executable by at least one processor to cause the at least one processor to perform the method of processing an image provided by the present disclosure. The non-transient computer-readable storage medium of the present disclosure stores computer instructions for causing a computer to perform the method of processing an image provided by the present disclosure.

The memory 902, as a non-transitory computer readable storage medium, may be used to store non-transitory software programs, non-transitory computer executable programs, and modules, such as program instructions/modules corresponding to the method of processing images in embodiments of the present disclosure (e.g., the image sequence set acquisition module 810, the original three-dimensional model modeling module 820, and the final three-dimensional model modeling module 830 shown in FIG. 8). The processor 901 executes various functional applications and data processing of the server by running non-transitory software programs, instructions, and modules stored in the memory 902, that is, implements the method of processing an image in the above-described method embodiment.

The memory 902 may include a storage program area and a storage data area, wherein the storage program area may store an operating system, an application program required by at least one function; the storage data area may store data or the like created according to the use of the electronic device 900. In addition, memory 902 may include high speed random access memory, and may also include non-transitory memory, such as at least one magnetic disk storage device, flash memory device, or other non-transitory solid state storage device. In some embodiments, memory 902 may optionally include remotely disposed memory relative to processor 901, which may be connected to electronic device 900 via a network. Examples of such networks include, but are not limited to, the Internet, enterprise intranets, local area networks, mobile communication networks, and combinations thereof.

The electronic device 900 may also include an input device 903 and an output device 904. The processor 901, the memory 902, the input device 903, and the output device 904 may be connected via a bus or otherwise, as illustrated in FIG. 9.

The input device 903 may receive input digit or character information and generate key signal input related to user settings and functional control of the electronic device 900, such as a touch screen, a keypad, a mouse, a track pad, a touch pad, a pointer bar, one or more mouse buttons, a trackball, a joystick, or the like. The output device 904 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or means (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user; for example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other.

According to the technical solution of the embodiment of the present disclosure, by dividing a set of image sequences including an image sequence set into one or more image sequence subset according to the similarity between the image sequences, and then determining in each image sequence subset the correlation degree between an image in one image sequence and an image in other image sequence in the image sequence subset, an image having a high correlation degree can be effectively determined, so that subsequent time-consuming and resource-consuming feature matching calculation can be performed only for the determined image with high correlation degree, thereby reducing the calculation amount and improving the calculation efficiency. Furthermore, since the image sequence set is divided into one or more image sequence subset, different image sequence subset may be assigned to a different computing device to perform parallel feature matching calculations. In this way, it is possible to make full use of the calculation resources, further reduce the calculation time, and improve the calculation efficiency.

It is to be understood that reordering, adding or deleting of the steps may be performed using the various forms shown above. For example, the steps described in the present disclosure may be performed in parallel or sequentially or in a different order, so long as the desired results of the technical solution disclosed in the present disclosure can be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and improvements that fall within the spirit and principles of the disclosure are intended to be included within the scope of protection of the disclosure.

What is claimed is:

1. A method for processing an image, comprising:
   acquiring a set of image sequences, the set of image sequences comprising a plurality of image sequence subsets divided according to similarity measurements between image sequences, each image sequence subset comprising a basic image sequence and other image sequence, wherein a first similarity measurement corresponding to the basic image sequence is greater than a first similarity measurement corresponding to the other image sequence, wherein a correlation between images in the basic image sequence is highest in the set of image sequences, and the highest correlation is embodied as having a higher similarity measurement;
   creating an original three-dimensional model using the basic image sequence in which images have the highest correlation; and
   creating a final three-dimensional model using the other image sequence in which images have a lower correlation based on the original three-dimensional model.

2. The method of claim 1, wherein a second similarity measure corresponding to an image sequence subset in each image sequence subset is greater than or equal to a second similarity measure corresponding to an image sequence subset in other image sequence subsets.

3. The method of claim 1, wherein creating an original three-dimensional model comprises:
   determining a correlated image for each basic image sequence between the basic image sequences according to at least one of:
   acquisition positions of images, and
   a third similarity measure between the images; and
   creating the original three-dimensional model using the correlated image for the basic image sequence.

4. The method of claim 3, wherein creating the original three-dimensional model comprises:

dividing the correlated images into a plurality of corresponding basic segments according to an order of acquiring the images;
creating an original basic segmented three-dimensional model using one corresponding basic segment of the corresponding basic segments;
creating an incremental basic segmented three-dimensional model using a corresponding basic segment adjacent to the one corresponding basic segment, based on the created original basic segmented three-dimensional model; and
fusing the created original basic segmented three-dimensional model and the created incremental basic segmented three-dimensional model to obtain the original three-dimensional model.

5. The method of claim 4, wherein a plurality of the incremental basic segmented three-dimensional models are created in parallel.

6. The method of claim 4, wherein creating the final three-dimensional model comprises:
   determining the correlated images between image sequences in the set of image sequences according to at least one of:
      acquisition positions of the images, and
      the third similarity measure between the images, wherein the correlated images comprise a correlated image for the basic image sequence and a correlated image for the other image sequence;
   dividing the correlated images into a plurality of corresponding segments according to an order of acquiring images, the plurality of corresponding segments comprising a plurality of corresponding basic segments and a plurality of corresponding other segments divided from the other image sequences;
   creating a plurality of intermediate three-dimensional models based on the original three-dimensional model using the corresponding other segments corresponding to the original basic segmented three-dimensional model and the incremental basic segmented three-dimensional model; and
   fusing the plurality of intermediate three-dimensional models to obtain the final three-dimensional model.

7. The method of claim 6, wherein a plurality of the intermediate three-dimensional models are created in parallel.

8. The method of claim 3, wherein creating the final three-dimensional model comprises:
   determining the correlated images between image sequences in the acquired set of image sequences according to at least one of:
      acquisition positions of the images, and
      a third similarity measure between the images, wherein the correlated images comprise a correlated image for the basic image sequence and a correlated image for the other image sequence; and
   creating the final three-dimensional model using the correlated image for the other image sequence.

9. The method of claim 1, wherein creating the final three-dimensional model comprises:
   creating a plurality of intermediate three-dimensional models based on the original three-dimensional model using the other image sequence in the plurality of image sequence subsets, respectively; and
   fusing the plurality of intermediate three-dimensional models to obtain the final three-dimensional model.

10. The method of claim 9, wherein the plurality of the intermediate three-dimensional models are created in parallel.

11. An electronic device, comprising:
   at least one processor; and
   a memory in communication connection with the at least one processor;
   wherein, the memory stores instructions executable by the at least one processor, the instructions are performed by the at least one processor to enable the at least one processor to perform operations comprising:
   acquiring a set of image sequences, the set of image sequences comprising a plurality of image sequence subsets divided according to similarity measurements between image sequences, each image sequence subset comprising a basic image sequence and other image sequence, wherein a first similarity measurement corresponding to the basic image sequence is greater than a first similarity measurement corresponding to the other image sequence wherein a correlation between images in the basic image sequence is highest in the set of image sequences, and the highest correlation is embodied as having a higher similarity measurement;
   creating an original three-dimensional model using the basic image sequence in which images have the highest correlation; and
   creating a final three-dimensional model using the other image sequence in which images have a lower correlation based on the original three-dimensional model.

12. The device of claim 11, wherein a second similarity measure corresponding to an image sequence subset in each image sequence subset is greater than or equal to a second similarity measure corresponding to an image sequence subset in other image sequence subsets.

13. The device of claim 11, wherein the creating an original three-dimensional model comprises:
   determining a correlated image for each basic image sequence between the basic image sequences according to at least one of:
      acquisition positions of images, and
      a third similarity measure between the images; and
   creating the original three-dimensional model using the correlated image for the basic image sequence.

14. The device of claim 13, wherein creating the original three-dimensional model comprises:
   dividing the correlated images into a plurality of corresponding basic segments according to an order of acquiring the images;
   creating an original basic segmented three-dimensional model using one corresponding basic segment of the corresponding basic segments;
   creating an incremental basic segmented three-dimensional model using a corresponding basic segment adjacent to the one corresponding basic segment, based on the created original basic segmented three-dimensional model; and
   fusing the created original basic segmented three-dimensional model and the created incremental basic segmented three-dimensional model to obtain the original three-dimensional model.

15. The device of claim 14, wherein a plurality of the incremental basic segmented three-dimensional models is created in parallel.

16. The device of claim 14, wherein creating the final three-dimensional model comprises:

determining the correlated images between image sequences in the set of image sequences according to at least one of:
acquisition positions of the images, and
the third similarity measure between the images, wherein the correlated images comprise a correlated image for the basic image sequence and a correlated image for the other image sequence;
dividing the correlated images into a plurality of corresponding segments according to an order of acquiring images, the plurality of corresponding segments comprising a plurality of corresponding basic segments and a plurality of corresponding other segments divided from the other image sequences;
creating a plurality of intermediate three-dimensional models based on the original three-dimensional model using the corresponding other segments corresponding to the original basic segmented three-dimensional model and the incremental basic segmented three-dimensional model; and
fusing the plurality of intermediate three-dimensional models to obtain the final three-dimensional model.

17. The device of claim 13, wherein creating the final three-dimensional model comprises:
determining the correlated images between image sequences in the acquired set of image sequences according to at least one of:
acquisition positions of the images, and
a third similarity measure between the images, wherein the correlated images comprise a correlated image for the basic image sequence and a correlated image for the other image sequence; and
creating the final three-dimensional model using the correlated image for the other image sequence.

18. The device of claim 11, wherein creating the final three-dimensional model comprises:
creating a plurality of intermediate three-dimensional models based on the original three-dimensional model using the other image sequence in the plurality of image sequence subsets, respectively; and
fusing the plurality of intermediate three-dimensional models to obtain the final three-dimensional model.

19. The device of claim 18, wherein the plurality of the intermediate three-dimensional models are created in parallel.

20. A non-transitory computer-readable storage medium storing computer instructions for causing a computer to perform operations comprising:
acquiring a set of image sequences, the set of image sequences comprising a plurality of image sequence subsets divided according to similarity measurements between image sequences, each image sequence subset comprising a basic image sequence and other image sequence, wherein a first similarity measurement corresponding to the basic image sequence is greater than a first similarity measurement corresponding to the other image sequence, wherein a correlation between images in the basic image sequence is highest in the set of image sequences, and the highest correlation is embodied as having a higher similarity measurement;
creating an original three-dimensional model using the basic image sequence in which images have the highest correlation; and
creating a final three-dimensional model using the other image sequence in which images have a lower correlation based on the original three-dimensional model.

* * * * *